(12) United States Patent
Ye

(10) Patent No.: US 7,563,840 B2
(45) Date of Patent: Jul. 21, 2009

(54) FLAME RETARDANT POLYESTER RESIN COMPOSITION AND ARTICLES FORMED THEREFORM

(75) Inventor: Yijun Ye, Saunderstown, RI (US)

(73) Assignee: Toray Plastics (America), Inc., North Kingstown, RI (US)

(*) Notice: Subject to any disclaimer, the term of this patent is extended or adjusted under 35 U.S.C. 154(b) by 355 days.

(21) Appl. No.: 10/541,461

(22) PCT Filed: Dec. 31, 2003

(86) PCT No.: PCT/US03/41672

§ 371 (c)(1),
(2), (4) Date: May 30, 2006

(87) PCT Pub. No.: WO2004/063247

PCT Pub. Date: Jul. 29, 2004

(65) Prior Publication Data

US 2007/0142536 A1    Jun. 21, 2007

Related U.S. Application Data

(60) Provisional application No. 60/438,261, filed on Jan. 6, 2003.

(51) Int. Cl.
*C08K 3/34* (2006.01)
*B32B 27/38* (2006.01)

(52) U.S. Cl. .................. 524/449; 524/451; 428/480
(58) Field of Classification Search ............... 524/449, 524/451; 428/480
See application file for complete search history.

(56) References Cited

U.S. PATENT DOCUMENTS

| | | | |
|---|---|---|---|
| 4,042,561 A | 8/1977 | DeEdwardo et al. | |
| 4,104,259 A | 8/1978 | Kato et al. | |
| 4,157,436 A | 6/1979 | Endo et al. | |
| 4,362,839 A | 12/1982 | Tonoki et al. | |
| 4,517,355 A | 5/1985 | Mercati et al. | |
| 5,650,531 A | 7/1997 | Chang et al. | |
| 6,136,892 A | 10/2000 | Yamauchi et al. | |
| 6,174,943 B1 | 1/2001 | Matsumoto et al. | |
| 6,458,880 B1 | 10/2002 | Onder et al. | |
| 6,677,031 B1 * | 1/2004 | Murooka et al. | 428/212 |
| 6,784,233 B1 * | 8/2004 | Weber et al. | 524/126 |
| 6,841,222 B2 * | 1/2005 | Murschall et al. | 428/141 |
| 2001/0018476 A1 | 8/2001 | Murschall et al. | |
| 2001/0029274 A1 | 10/2001 | Murschall et al. | |

FOREIGN PATENT DOCUMENTS

WO      WO 01/88035      11/2001
WO      WO 02/066538      8/2002

OTHER PUBLICATIONS

Patent Abstracts of Japan, vol. 1998, No. 08, Jun. 30, 1998; English abstract of JP 10 060160, published Mar. 3, 1998.

* cited by examiner

*Primary Examiner*—Peter Szekely
(74) *Attorney, Agent, or Firm*—Morrison & Foerster LLP

(57) ABSTRACT

A flame retardant polyester resin composition including polyester containing phosphorus, preferably about 0.05 to about 1.5 weight % based on the total weight of the composition, of at least one platy inorganic material. The composition provides excellent flame retardant and anti-dripping properties, especially to oriented polyester film formed from the composition. The polyester may include additional phosphorus that is covalently bonded to the polymer, or physically incorporated into the polyester such as by means of masterbatch.

26 Claims, No Drawings

FLAME RETARDANT POLYESTER RESIN COMPOSITION AND ARTICLES FORMED THEREFROM

TECHNICAL FIELD

This invention relates to a flame retardant polyester resin composition. The invention more particularly relates to a non-halogen based flame retardant polyester resin composition providing flame resistance and dripping resistance and to films and articles formed from the non-halogen based polyester resin composition.

BACKGROUND OF THE INVENTION

Flame retardant thermoplastic resins have been widely used, particularly in the electric and electronic packaging industry. For many applications, a plastic is deemed acceptable for use as part of a device or appliance with respect to its flammability if it achieves a UL 94 (Underwriters Laboratory®) flammability test rating of V-0 for stock shape products (sheet, rod, tube and film) or VTM-0 for thin materials. Briefly, a UL 94 Flammability Rating of V-0 means that using a vertical burn test, burning stops within 10 seconds after two applications of ten seconds each of a flame to a test bar. No flaming drips are allowed. Traditionally, halogenated compounds have been employed as flame retardants in combination with one or more synergists to achieve high levels of safety against flames (flame retardancy). Halogen based compounds are very effective in imparting flame retardancy, especially when used in combination with a synergist such as antimony oxide. With such combinations, a relatively low amount of flame retardant is required to achieve the desired V-0 rating.

Several types of processes are known for preparing halogenated flame retardants. Most of these materials are immiscible to polymers. Thus, multiphase systems are formed which result in a resin that is non-transparent. If the preparation involves orientation, cavitations during the stretching process render the material even more non-transparent. Recently, several melt extrudable flame retardants have become commercially available. Such flame retardants include brominated polystyrene, among others. However, most of these flame retardants are not very heat stable, especially at high processing temperatures. For example, decomposition of flame retardant halogenated polyester produces free halogen gas and/or halogen compounds which are extremely harmful to the process equipment as well as the environment. These compounds may corrode dies, extruders, and other metallic parts. In recent years, there has been a movement to completely regulate the use of halogenated material due to overall environmental concerns. This is especially true in Europe and Japan.

By using special catalysts during polymerization, polyethyleneterephthalate (PET) can be prepared to attain a moderate flame retardancy of V-2. To obtain a V-0 rating, various flame retardants must be compounded into the PET. For thin film, a VTM-2 rating can be obtained when the film is thick enough (with thickness of about 2 to about 20 mil typically required) and/or when the molecular weight of the PET is high enough. U.S. Pat. No. 6,136,892 to Yamauchi et al., discloses thermoplastic resin compositions, including PET and its copolyester, having red phosphorus to obtain the desired flame retardancy. However, U.S. Pat. No. 6,136,892 is directed to injection molding applications only wherein the part is thick and not oriented, such as for mechanical parts, electric and electronic parts, automobile parts, and housings and other parts of office automation apparatuses and household electric appliances, thereby limiting its usefulness.

U.S. Pat. No. 4,042,561 to DeEdwardo et al. discloses flame retardant compositions containing polyphosphazenes blended in resins including polyester, polyamide, and polycarbonate resins. The polyphosphazenes taught in U.S. Pat. No. 4,042,561 are halogenated.

U.S. Pat. No. 4,104,259 to Kato et al. discloses fireproof polyesters comprising linear aromatic copolyester with flame retardant elements in the polyester backbone. The copolyester is prepared from brominated dihydroxy alkoxy-diphenyl sulfones. The addition of an organic penta-valent phosphorus compound is needed in many cases to impart the desired fireproof properties to products prepared from the polyesters.

U.S. Pat. No. 4,517,355 to Mercati et al. discloses a linear flame retardant copolyester resin containing phosphorus in the polymer backbone.

U.S. Pat. No. 5,650,531 to Chang et al. and U.S. Pat. No. 4,157,436 to Endo et al. disclose the use of flame retardant phosphorus-containing polyester oligomer and polymer resin having pendant phosphorus containing groups. U.S. Pat. Nos. 5,650,531 and 4,157,436 teach the polyester having a greater heat-stability as compared to polyester having phosphorus in the backbone. Additionally, WO02066538A1 discloses a polyester film having phosphorus-containing flame retardant copolyester wherein the phosphorus atoms are present in the side chain.

U.S. Patent Application 2001-0018476 and U.S. Patent Application 2001-0029274 disclose low flammability and UV resistant oriented polyester film. The flame retardant disclosed is an organic phosphorous compound, dimethyl methylphosphate, incorporated into the film by means of masterbatch. However, a large amount of flame retardant is needed to obtain the desired flame retardant properties. Additionally, since the flame retardant is susceptible to hydrolysis, hydrolysis stabilizers are generally used.

The tendency for most thermoplastic resins to burn is one problem in the art. Further, under intensive heat, burning plastics also melt and decompose. The resultant burning polymer drips, thereby causing additional problems. Therefore, the UL-94 standard includes dripping criteria. In order to achieve a UL-94 V-0 (or VTM-0) rating, there cannot be dripping that causes cotton positioned 300 millimeters below the test subject to be ignited by flaming particles or drops. Although in most halogenated flame retardant systems, anti-dripping particles are not required, with phosphorous based flame retardants, anti-dripping particles are generally needed. For most molding applications, a fluorinated polyolefin has been traditionally used to prevent dripping. In addition, grafting or cross-lining agents have been used for this purpose.

Talc and other layered inorganic materials have been used in the plastics industry due to the ability of these materials to increase dimensional stability, flexural modulus, and impart improved heat distortion temperature. For polypropylene film, these materials have been used as anti-blocking or nucleation agents. Talc has also been combined with polyurethane to facilitate crystallization of a polyurethane composition, particularly a polyester-based polyurethane composition (see U.S. Pat. No. 6,458,880). The addition of talc can enable rapid formation of products by, for example, injection molding, compression molding, extrusion, and film formation techniques. U.S. Pat. No. 6,174,943 discloses a flame retarding polycarbonate composition having an organo-phosphorous material. In U.S. Pat. No. 6,174,943, talc is used as an effective material for preventing dripping of the molded articles.

The disclosures of the foregoing are incorporated herein by reference in their entireties.

SUMMARY OF THE INVENTION

The invention provides a flame retardant polyester resin composition comprising:

at least one polyester containing phosphorus, preferably about 0.05 to about 1.5 weight % phosphorus based on the total weight of the composition, more preferably about 0.10 to about 1.0 weight % phosphorus based on the total weight of the composition; and about 1.0 to about 15 weight % of at least one platy inorganic material based on the total weight of the composition.

Preferably, particles forming the platy inorganic material have a median diameter of about 0.5 to about 20 microns and a top size of about 5 to about 50 microns. If desired, the platy inorganic material is treated to increase adhesion to polyester.

In an alternate embodiment, at least one polyester comprises additional phosphorous that is covalently bonded to the polymer, incorporated physically, or incorporated into the polyester by means of masterbatch. "Masterbatch" process as used herein means any compounding, blending or mixing process of an active ingredient(s) in an inert diluent(s).

The invention further provides a polyester film comprising the present flame retardant resin composition. In a preferred embodiment, the invention comprises a biaxially oriented polyester film comprising the flame retardant resin composition. The flame retardant resin composition provides excellent flame retardant and antidripping properties, especially to orientated polyester films prepared with the flame retardant resin composition.

DETAILED DESCRIPTION

A flame retardant polyester resin composition comprises at least one polyester containing about 0.05 to about 1.5 weight % phosphorus based on the total weight of the composition; and about 1.0 to about 15 weight % of at least one platy inorganic material based on the total weight of the composition. Most preferably, the flame retardant polyester composition is used to prepare biaxially oriented polyester film. The flame retardant polyester resin composition comprises phosphorous that is either covalently bonded into the polyester during the polymerization process or physically incorporated into the polyester by methods such as masterbatch. Platy materials are incorporated into the composition as effective flame retardant synergists and anti-dripping agents. Films prepared with the flame retardant polyester resin compositions are provided. The resultant films pass UL94 VTM-0 standards. The composition achieves this flame retardancy standard while retaining mechanical properties of the film.

The polyester comprises copolyester, homopolyester, or a blend of copolyester and homopolyester. The polyester is a polymer of one or more dicarboxylic acids and one or more diols by the usual polycondensation process.

The dicarboxylic acid component of the polyester comprises one or more dicarboxylic acids or low alkyl diesters thereof. Examples of suitable dicarboxylic acids include, but are not limited to, terephthalic acid, isophthalic acid, phthalic acid, naphthalenedicarboxylic acids, succinic acid, sebacic acid, adipic acid, azelaic acid, and mixtures thereof. In a preferred embodiment, the dicarboxylic acid component of the polyester comprises an aromatic dicarboxylic acid.

Diols suitable for use in the composition include, but are not limited to, ethylene glycol, 1,3-propanediol, 1,4-butanediol, neopentyl glycol, 1,6-hexanediol, 1,4-cyclohexanedimethanol and mixtures thereof.

The flame retardant component of the polyester comprises a non-halogenated flame retardant component covalently bonded into the polyester during the polymerization process and/or physically incorporated into the polyester by blending. In a preferred embodiment, the flame retardant component comprises a phosphorus-containing flame retardant component. The phosphorus content can be incorporated into the polyester covalently and/or physically compounded into the polymer with a masterbatch process. Chemically bonded phosphorous is preferred because it prevents bleeding of the flame retardant component to the surface. Covalently bonded phosphorus is incorporated into the polyester backbone or on the side chain pending from the polyester backbone. The resin composition comprises from about 0.05 to about 1.5 weight % phosphorus based on the total weight of the composition. In a preferred embodiment, the resin composition contains from about 0.1 to about 1.0 weight % phosphorus based on the total weight of the composition. In a preferred embodiment, the phosphorous is contained within a phosphorous ester.

Preferably, the polyester and copolyester resins have an initial intrinsic viscosity (IV) of about 0.40 to about 1.50, more preferably about 0.50 to about 1.20, and most preferably about 0.60 to about 0.80.

The polyester film may be prepared by conventional methods known in the art. The polyester film can be unoriented (cast), uniaxially oriented, or, preferably, biaxially oriented such as by stretching. Alternatively, orientation may be effected by other processes such as blown processes.

The polyester film may comprise a single layer or a multilayer film wherein at least one layer comprises the flame retardant component. The layers may comprise the polyester(s) of the dicarboxylic acid and diol components as described above and each layer may be the same or different in composition. Typical multilayer structures include, but are not limited to, formats such as AB, ABA, ABC, and ABCBA. For heat sealing applications, an outer layer may comprise a heat sealable copolyester or copolyester blend outer layer. Total film thickness is from about 18 G to about 2000 G, preferably from about 48 G to about 1200 G.

In the invention, layered or plate-like (platy) inorganic materials impart anti-dripping and flame retardant properties to the composition and include silicate compounds such as talc and mica. The layered or platy inorganic materials further provide heat resistance and enhance surface properties. Talc, for example, is a magnesium silicate having the general chemical formula $3MgO.4SiO_2.H_2O$. It is composed of alternating layers comprising MgO sandwiched between layers of $SiO_2$. These stacks of triple sheet crystalline units are held together by van der Waals forces. They are chemically inert and can be ground into platy structures. The aspect ratio (defined as the length of the particle divided by the thickness), which gives an indication of platy structure, can be as high as about 25 for talc and even higher for mica. The platy silicates can be characterized by median size and top size, with top size being determined using a Hegman-type gage. For example, a Hegman of 6 is a top size of 26 microns and a Hegman of 4 is a top size of 50 microns.

When used in a compound, the platyness of the layered silicates improves the permeability resistance of rubber, plastics, paint, and coatings. When talc or other silicate layered minerals are used in film, the plates align and form a barrier to both heat and gases entering or leaving the polymer film matrix. Typical polymer processing leads to preferred orientation with the platelets aligned substantially parallel to the surface. Stretching of the film further enhances such alignment. It is believed that the aligned, overlapping plates greatly increase the diffusion distance by creating a tortuous path for diffusing species. Such alignment of plates greatly improves flame retardancy. For a polymer to burn, three elements are needed: oxygen, fuel and heat. Once a polymer is ignited, the heat will melt and decompose the polymer thereby generating additional fuel causing the polymer to continue burning until the fuel runs out. The improved barrier as provided with the invention reduces the thermal conductivity and the emission of volatile products (fuel) to the flame area, providing excellent flame retardant properties to the composition. The interconnected structure of talc aids in holding the polymer together thereby reducing dripping. For a typical phosphorus-containing flame retardant, the mode of flame retardancy is charring. The layer of char acts as an insulating, non-burning material and reduces the emission of volatile products. The addition of layered materials provides a reinforcing insulating effect further improving overall flame retardancy.

The surface of the plates can be modified to improve the adhesion between the polymer and the platy silicate, such as by treating with silanes, cationic polymers, and stearates. The kinds and origins of the silicates suitable for use in the invention are not particularly limited and can be selected from many commercially available sources.

Other materials and additives conventionally employed in the manufacturing of polyester film may be included, if desired, in the invention. Such materials and additives include organic and inorganic additives. Organic additives, include, but are not limited to, antioxidants, UV absorbers, optical brighteners, dyes, pigments, voiding agents, and anti-blocking agents. Inorganic additives, include, but are not limited to, slip aids, pigments, UV absorbers, and anti-blocking agents. In a preferred embodiment, the polymer film of the invention may comprise fillers such as silica, aluminum oxide, or calcium carbonate, to improve winding and handling of the film. There are no limitations as to the particular methods for incorporating these additives into the polymer. Incorporation may be accomplished, for example, by incorporating covalently, by incorporating during polymerization, or by way of masterbatch.

The film may comprise any appearance desired. In terms of clarity or haze, films herein may be ultra-clear, super-clear, clear, hazy, translucent, or opaque. In terms of haze, ultra-clear refers to haze less than 0.5%; super-clear refers to haze between 0.5 and 0.8%; and clear refers to clear film with haze higher than 1.0%. Haze is measured per ASTM D1003. In terms of color, the films may be black, white, or any color. The surface of the film may comprise a gloss, semi-gloss, or matte surface. The appearance may be imparted to the film by any method without limitation.

EXAMPLES

Selected aspects of the invention will now be illustrated with reference to the following examples. Films prepared in accordance with aspects of the invention were used. Different types of plain PET resins were mixed with flame retardant copolyester and layered inorganic silicates. The layered silicates, including talc and mica, were incorporated into the polyester by compounding or during polymerization. The resin was then extruded into cast film of various thicknesses. In some cases, the cast film was further stretched biaxially in a polyester film line to obtain biaxially oriented polyester film.

The films were then tested for flame retardancy per UL94. Other properties, including mechanical properties and optical properties were also measured as follows. Herein, the abbreviation "mm" is used to refer to millimeter or millimeters. In measuring flame retardancy of the film per UL 94, a set of five test film specimens (200 mm×50 mm) were prepared and on each a line was marked across the specimen at 125 mm from one end (bottom) of the specimen. The longitudinal axis of each specimen was wrapped tightly around the longitudinal axis of a 12.7 mm in diameter mandrel to form a lapped cylinder 200 mm long with the 125 mm line exposed. The overlapping ends of the specimens were secured within the 75 mm portion above the 125 mm mark with pressure sensitive tape. The mandrel was then removed. Each test specimen was supported from the upper 6 mm by a clamp on a ring stand so that the upper end of the tube was closed to prevent any chimney effects. The lower end of the test specimen was situated 300 mm above a layer of dry surgical cotton. The test specimen was ignited using a 20 mm methane flame for 3.0 seconds (s). The flame was then withdrawn from the test specimen and the duration of flaming (t1) was recorded. When flaming of the test specimen ceased, the methane flame was placed again under the specimen. After 3.0 seconds, the test flame was withdrawn, and the duration of the flaming (t2) and glowing (t3) was noted. The materials classification for thin film per UL94 is as follows. For film to obtain a VTM-0 rating, not only the flaming and glowing time has to be short, but also the flame cannot drip and ignite the cotton.

TABLE 1

| Criteria Conditions | Materials Classifications | | |
| --- | --- | --- | --- |
| | VTM-0 | VTM-1 | VTM-2 |
| Afterflame time for each individual specimen t1 or t2 | ≦10 s | ≦30 s | ≦30 s |
| Total afterflame time for the set (t1 plus t2 for the 5 specimens) | ≦50 s | ≦250 s | ≦250 s |
| Afterflame plus after glow time for each individual specimen after the second flame application (t2 + t3) | ≦30 s | ≦60 s | ≦60 s |
| Afterflame or afterglow of any specimen up to the holding clamp | No | No | No |
| Cotton indicator ignited by flaming particles or drips | No | No | Yes |

The mechanical properties, including tensile strength and elongation at break, were measured using a tensile tester per ASTM D-882. The thickness of the film was measured using a micrometer.

Haze of the film was measured using a Byk Gardner Haze Gard Plus Hazemeter according to ASTM D1003. 60 degree gloss of the film was measured using a Byk Gardner Trigloss meter. A film sample holder was used to tighten the film for the measurement. The sample holder was black so that any transmitted light will be absorbed.

The flame retardant (FR) resins used were FR8247 and FR8934, clear polyphosphate-based high flame retardant grade copolyester resins commercially available from KoSa, Houston, Tex.

Laser+® polyethylene terephthalate, a copolyester commercially available from DAK Americas, Chadds Ford, Pa., was used. It had an intrinsic viscosity of 0.83.

Cimpact (talc1) and Cimpact CB7 (talc2), a platy mineral-anhydrous magnesium silicate ($3MgO.4SiO_2.H_2O$), available from Luzenac America, Englewood Colo. was employed as the talc. The latter was surface modified to improve the adhesion to polyester. Both had a median diameter of 1.8 μm and 12.5 μm top size.

Example 1

Into copolyester resin FR8247, 20% by weight of talc1 was mixed into a co-rotating twin screw extruder. The extruded strands were cooled in a water trough and pelletized via cutting on a rotary cutting line. The resultant pellets were then admixed with pure copolyester FR8247 chips, extruded and cast into sheets of 2 mil film to prepare film having 2% and 5% by weight of talc1. The film was clear and no discoloration of the 2 mil cast film was noted. The total phosphorous content was about 0.35%. The flame retardancy of this film was tested and passed with a VTM-0 rating.

Example 2

Into copolyester resin FR8247, 20% by weight of talc2 was mixed into a co-rotating twin screw extruder. The extruded strands were cooled in a water trough and pelletized via cutting on a rotary cutting line. The resultant pellets were then admixed with pure copolyester FR8247 chip, extruded, and cast into sheets of 2 mil film to prepare film having 2% by weight of talc2. The film was clear and no discoloration of the 2 mil cast film was noted. The total phosphorous content was about 0.35%. The flame retardancy of this film was tested and passed with a VTM-0 rating.

Example 3

Into DAK Laser+® polyester resin, 30% by weight of talc1 was mixed into a co-rotating twin screw extruder. The extruded strands were cooled in a water trough and pelletized via cutting on a rotary cutting line. The resultant pellets were admixed with pure copolyester FR8247 chip, extruded and cast into sheets of film in a pilot line to prepare film having 1.5% by weight of talc1. Film thickness was 6.5 and 12 mil. The film was clear and no discoloration of the cast film was noted. The total phosphorous content was about 0.32%. The flame retardancy of this film was tested and passed with a VTM-0 rating per UL94.

Example 4

Into DAK Laser+® polyester resin, 30% by weight of talc1 was mixed into a co-rotating twin screw extruder. The extruded strands were cooled in a water trough and pelletized via cutting on a rotary cutting line. The resultant pellets were then admixed with 67% by weight copolyester FR8934 resin, 28% by weight Toray PET F1CC resin and 5% by weight Toray PET resin D2SY70. D2SY70 was introduced to control the friction (COF) and improve the handling. The pellets were extruded and cast into sheets of film in a pilot line. Film was prepared having 1.5% by weight of talc1 and the film thickness was 6.5 and 12 mil. The film was clear and no discoloration of the cast film was noted. The total phosphorous content was about 0.46%. The flame retardancy of this film was tested and passed with a VTM-0 rating per UL94.

Example 5

Into DAK Laser+® polyester resin, 30% by weight of talc1 was mixed into a co-rotating twin screw extruder. The extruded strands were cooled in a water trough and pelletized via cutting on a rotary cutting line. The resultant pellets were then admixed with 67% by weight copolyester FR8934 resin, 28% by weight Toray PET F1 CC resin and 5% by weight Toray PET resin D2SY70. D2SY70 was introduced to control the friction (COF) and improve handling. The pellets were extruded and cast into sheets of film in a polyester pilot line. Biaxially oriented film was prepared at 1.5% by weight of talc1 and the film thickness was 0.92 mil. The film was hazy and no discoloration of the cast film was noted. The total phosphorous content was about 0.46%. The mechanical properties of the film were retained and there were no problems in the process. The flame retardancy of this film was tested and passed with a VTM-0 rating per UL94.

Comparative Example 1

Pellets of pure copolyester FR8247 were mixed with Toray PET resin F23M and extruded and cast into sheets of ca. 5 mil film. Film was prepared at 0, 0.12, 0.23 and 0.35 weight % of total phosphorous. The film was clear and no discoloration of the 5 mil cast film was noted. The flame retardancy of this film was tested and it did not pass with a VTM-0 rating per UL94.

Comparative Example 2

Pellets of pure copolyester FR8247 were mixed with Toray PET resin F118 resin, extruded and cast into sheets of ca. 5 mil film. F118 resin contains spherical silica with an average particle size of 2.5 microns. Film was prepared at 1.0% by weight of total silica. The film was clear and no discoloration of the 5 mil cast film was noted. The total phosphorous content was about 0.18%. The flame retardancy of this film was tested and it did not pass with a VTM-0 rating per UL94.

Comparative Example 3

Pellets of pure copolyester FR8247 were mixed with Toray PET resin F367 resin, extruded and cast into sheets of ca. 5 mil film. F367 contains spherical calcium carbonate with an average particle size of 0.7 microns. Film was prepared at 1.5% by weight of total calcium carbonate. The film was clear and no discoloration of the 5 mil cast film was noted. The total phosphorous content was about 0.18%. The flame retardancy of this film was tested and it did not pass with a VTM-0 rating per UL94.

Comparative Example 4

Pellets of pure copolyester FR8247 were mixed with Toray PET resin F170 resin, extruded and cast into sheets of ca. 5 mil film. F170 contains spherical alumina with an average particle size of 0.1 microns. Film was prepared at 0.8% by weight of total alumina. The film was clear and no discoloration of the 5 mil cast film was noted. The total phosphorous content was about 0.18%. The flame retardancy of this film was tested and it did not pass with a VTM-0 rating per UL94.

Comparative Example 5

Into copolyester resin FR8247, 20% by weight of polytetrafluoroethylene (PTFE) was mixed into a co-rotating twin screw extruder. The extruded strands were cooled in a water trough and pelletized via cutting on a rotary cutting line. The resultant pellets were admixed with pure copolyester FR8247 chip, extruded and cast into sheets of 2 mil film. Film was prepared at 1% and 5% by weight of PTFE. The film was slightly hazy and no discoloration of the 2 mil cast film was noted. The total phosphorous content was about 0.35%. The PTFE used was Ceridust 9205F commercially available from Clariant. It was a white spherical powder with a particle size of $D_{50}$=8 micron and $D_{90}$=18 microns. The flame retardancy of this film was tested and it did not pass with a VTM-0 rating.

Comparative Example 6

Into copolyester resin FR8247, 20% by weight of Dow Corning 4-7051 resin modifier was mixed into a co-rotating twin screw extruder. The extruded strands were cooled in a water trough and pelletized via cutting on a rotary cutting line. These pellets were then admixed with pure copolyester FR8247 chip, extruded and cast into sheets of 2 mil film. Film was prepared at 1% by weight of Dow Corning 4-7051 resin modifier. The dispersion of the resin modifier was bad and film was very hazy. The total phosphorous content was about 0.35%. The flame retardancy of this film was tested and did not pass with a VTM-0 rating. It was actually found to accelerate the burning.

Comparative Example 7

95% by weight copolyester FR8247 resin and 5% by weight Toray PET F1CC resin were mixed, extruded and cast into sheets of film in a polyester pilot line. This film was further stretched to prepare biaxially oriented film having a film thickness of about 0.92 mil. The final film was clear and no discoloration of the film was noted. The total phosphorous content was about 0.32%. There were no problems in the process. The flame retardancy of this film was tested and it was found that it did not pass with a VTM-0 rating.

The results from the examples are summarized in Table 2.

TABLE 2

|  | P % | Resin | % Additives | Thickness (mil) | UL94 VTM-0 | Appearance |
| --- | --- | --- | --- | --- | --- | --- |
| Example 1 | 0.35 | 8247 | 2% & 5% talc1 | 2.0 | yes | Clear film |
| Example 2 | 0.35 | 8247 | 2% talc2 | 2.0 | yes | Clear film |
| Example 3 | 0.32 | 8247 | 1.5% talc1 | 6.5 & 12 | yes | Clear film |
| Example 4 | 0.46 | 8934 | 1.5% talc1 | 6.5 & 12 | yes | Clear film |
| Example 5 | 0.46 | 8934 | 1.5% talc1 | 0.92 | yes | Hazy film |
| Comparative Example 1 | 0, 0.12, 0.23. 0.35 | 8247 | None | 5.0 | no | Clear film |
| Comparative Example 2 | 0.18 | 8247 | 1% silica | 5.0 | no | Clear film |
| Comparative Example 3 | 0.18 | 8247 | 1.5% calcium carbonate | 5.0 | no | Clear film |
| Comparative Example 4 | 0.18 | 8247 | 0.8% alumina | 5.0 | no | Clear film |
| Comparative Example 5 | 0.35 | 8247 | 1% PTFE | 2.0 | no | Semi-clear film |
| Comparative Example 6 | 0.35 | 8247 | 1% silicone/ fumed silica | 2.0 | no | Very hazy |
| Comparative Example 7 | 0.32 | 8247 | None | 0.92 | no | Clear film |

Phosphorus based flame retardant is believed to act in the mode of intumescence. A layer of char forms upon combustion that shields the polymer from the heat and oxygen. As seen from the above examples, the addition of certain inorganic minerals greatly increases the flame-retardant properties. Spherical minerals traditionally used for controlling friction and improving handling such as silica ($SiO_2$), calcium carbonate ($CaCO_3$), and aluminum oxide ($Al_2O_3$) do not contribute to the flame retardancy significantly. Only those asymmetrical, layered or platy particles improve the flame retardancy. The platy structure helps increase the barrier between polymer and the fire. The increased heat insulation reduces the decomposition of the polymer. The decrease in the permeability further reduces the migration of fuels to the fire. The interconnection of the platy structure helps to prevent dripping. Moreover, this shielding effect can be further increased when the film is stretched biaxially in polyester film.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A flame retardant resin composition comprising: at least one polyester containing phosphorus; and about 1.0 to about 15 weight %, based on the total weight of the composition, of at least one platy inorganic material, wherein said at least one polyester comprises phosphorus incorporated into a polymer back bone of said polyester or into a pendant group pending from said polyester polymer backbone.

2. The composition of claim 1, wherein said at least one polyester contains about 0.05 to about 1.5 weight % phosphorus based on the total weight of the composition.

3. The composition of claim 1, wherein said at least one polyester contains about 0.10 to about 1.0 weight % phosphorus based on the total weight of the composition phosphorus.

4. The composition of claim 1, wherein said at least one polyester comprises a copolyester, a homopolyester, or a blend of copolyester and homopolyester.

5. The composition of claim 1, wherein said phosphorous is covalently bonded into said at least one polyester.

6. The composition of claim 1, wherein said phosphorous is contained within a phosphorous ester.

7. The composition of claim 1, wherein said platy inorganic material comprises a platy inorganic material treated to provide increased adhesion to said at least one polyester.

8. The composition of claim 1, wherein said platy inorganic material is talc.

9. The composition of claim 8, wherein said platy inorganic talc comprises particles having a median diameter of about 0.5 to about 20 microns and a top size of about 5 to about 50 microns.

10. The composition of claim 1, wherein said platy inorganic material is mica.

11. The composition of claim 10, wherein said platy inorganic mica comprises particles having a median diameter of about 0.5 to about 20 microns and a top size of about 5 to about 50 microns.

12. A polyester film comprising: a flame retardant resin composition comprising: at least one polyester containing phosphorus; and about 1.0 to about 15 weight %, based on the total weight of the composition, of at least one platy inorganic material, wherein said at least one polyester comprises phosphorus incorporated into a polymer back bone of said polyester or into a pendant group pending from said polyester polymer backbone.

13. The polyester film of claim 12, wherein said at least one polyester contains about 0.05 to about 1.5 weight % phosphorus based on the total weight of the composition.

14. The polyester film of claim 12, wherein said at least one polyester contains about 0.10 to about 1.0 weight % phosphorus based on the total weight of the composition.

15. The polyester film of claim 12, wherein said polyester film comprises a biaxially oriented polyester film.

16. The polyester film of claim 12, wherein said film has a surface comprising a gloss surface.

17. The polyester film of claim 12, wherein said film has a surface comprising a semi-gloss surface.

18. The polyester film of claim 12, wherein said film has a surface comprising a matte finish.

19. The polyester film of claim 12, wherein said polyester film comprises a multilayer film wherein at least one layer of said multiplayer film comprises: a flame retardant resin composition comprising: at least one polyester containing phosphorus; and about 1.0 to about 15 weight %, based on the total weight of the composition, of at least one platy inorganic material.

20. The polyester film of claim 19, wherein said at least one polyester contains about 0.05 to about 1.5 weight % phosphorus based on the total weight of the composition.

21. The polyester film of claim 19, wherein said at least one polyester contains about 0.10 to about 1.0 weight % phosphorus based on the total weight of the composition.

22. The polyester film of claim 19, wherein at least one layer of said multiplayer film comprises a biaxially oriented polyester film.

23. The polyester film of claim 19, wherein said multilayer film comprises at least one heat sealable copolyester outer layer.

24. The polyester film of claim 19, wherein said film has a surface comprising a gloss surface.

25. The polyester film of claim 19, wherein said film has a surface comprising a semi-gloss surface.

26. The polyester film of claim 19, wherein said film has a surface comprising a matte finish.

\* \* \* \* \*